G. S. Barton.
Adjusting Gearing.
Nº 88,691.             Patented Apr. 6, 1869.
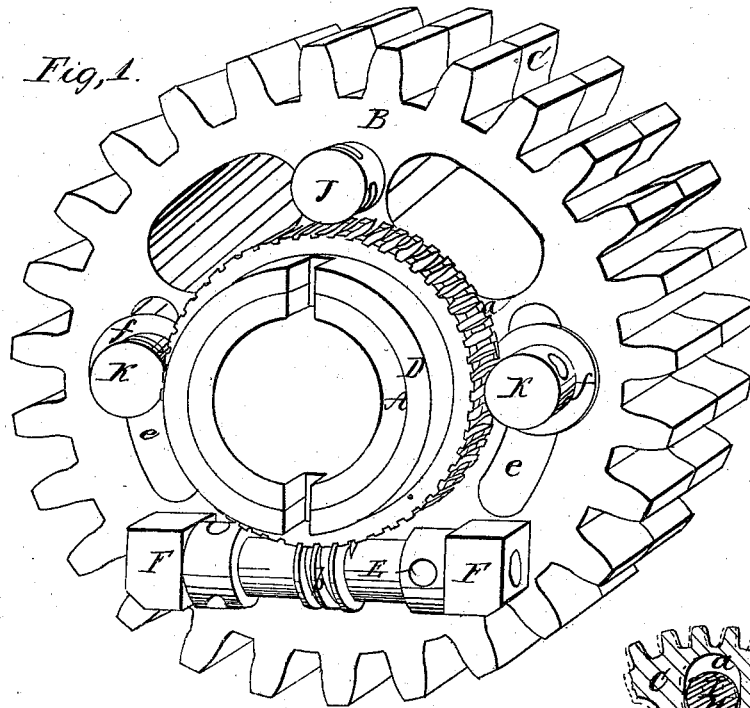
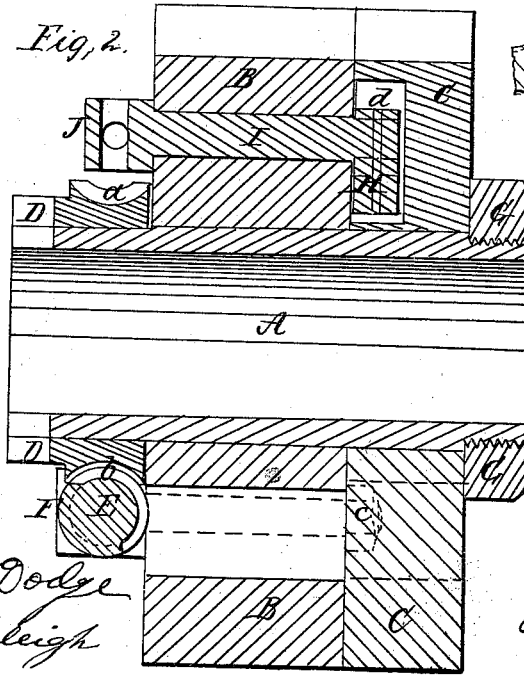
Witnesses,
Thos. H. Dodge
Chas. H. Burleigh
Inventor,
Geo. S. Barton

UNITED STATES PATENT OFFICE.

GEORGE S. BARTON, OF WORCESTER, MASSACHUSETTS, ASSIGNOR TO RICE, BARTON, AND FALES MACHINE AND IRON COMPANY, OF SAME PLACE.

IMPROVEMENT IN DEVICE FOR ADJUSTING GEARING.

Specification forming part of Letters Patent No. 88,691, dated April 6, 1869.

*Know all men by these presents:*

That I, GEORGE S. BARTON, of the city and county of Worcester, and Commonwealth of Massachusetts, have invented certain new and useful Improvements in Gear-Adjusting Devices; and I do hereby declare that the following is a full, clear, and exact description of the same, reference being had to the accompanying drawings, forming a part of this specification, in which—

Figure 1 represents a perspective view of a "split," or double gear with my present improvements applied thereto. Fig. 2 represents a central section of the sleeve, gears, cam, and cam-shaft shown in Fig. 1; and Fig. 3 represents, upon a reduced scale, a cross-section through the sleeve, a part of one of the gears, and the operating-cam.

To enable those skilled in the art to which my invention belongs to make and use the same, I will proceed to describe it more in detail.

The nature of my invention consists in combining with a double or "split" gear, as it is generally termed, of an operating-cam, cam-shaft, and holding bolt or bolts, as hereafter explained; second, in the combination, with a double or split gear, of a cam-shaft, cam-holding bolt or bolts, sleeve-adjusting screws, and sleeve-nut, as hereafter explained.

In the drawings, the double or split gear is shown upon a sleeve, A. It is composed of two parts, B and C.

Sleeve A has a hub, D, shrunk upon its outer end. The periphery of the hub D has a worm gear or thread, a, to receive the worm-thread b on the shaft E, which has its supports or bearings in the heads of the bolts F F, the shanks of which pass through the side of gear B, and are held in place by nuts c on the opposite side of said gear. (See dotted lines, Fig. 2.)

The inner side of gear C is cored or recessed out to give full room and space for nuts c, and permit the gears B and C to be moved in opposite directions without binding.

The inner end of the sleeve A is provided with a nut, G, to hold the gears B C in place.

A recess, d, is cut in the inner side of the gear C, in which works a cam, H, fastened upon the inner ends of a shaft, I, which passes through the gear B.

The head J of shaft I rests against the outer side of gear B, as fully shown in the drawings.

K K are holding-bolts, which pass through slots or recesses e e in gear B, and screw into screw-holes formed in the side of the gear C.

The heads of the holding-bolts K K rest upon washers f f, and are provided with holes, by which they can be turned in or out.

The head of shaft I, as well as the ends of shaft E, are provided with holes for operating the same.

The operation is as follows: In case there is backlash between the double gear B C and the gear into which it meshes, the holding-bolts K K are turned back and shaft I is turned, thereby operating cam H, whereby the part C of the double gear can be thrown forward or back, as indicated in red lines, Fig. 3, sufficiently to take up all backlash and make a good and perfect fit between the teeth of the double gear and the teeth of the gear into which it meshes, after which the holding-bolts K K can be turned up, and the parts B and C clasped firmly together.

The gears and devices shown in Fig. 1 are especially adapted for use in machines for printing cloth and paper, shaft E, worm b, and gear D being used for the purpose of correcting or adjusting the printing-roll, as will be fully understood by those skilled in the art.

By the use of cam H there is no danger of producing too close a fit between the teeth of the double gear and the teeth of the gear into which it meshes, and hence the frequent breaking of the teeth, which is occasioned by the use of a screw to take up the backlash, is obviated.

When used in printing-machines the sleeve A is to be fastened to the journal of one of the printing rolls or cylinders.

Although my improvements are more particularly adapted for use in cloth and paper printing machinery, a part, at least, of the invention may be used to advantage in other machinery.

Having described my improvements in gear-adjusting devices, what I claim therein as new and of my invention, and desire to secure by Letters Patent, is—

1. The combination, with the double gear B C, of cam H and shaft I, substantially as and for the purposes set forth.

2. The combination, with the double gear B C, of cam H, shaft I, with its head J, and holding-bolts K K, substantially as and for the purposes set forth.

3. The combination, with sleeve A and double or split gear B C, of nut G, hub D, with its teeth $a$, shaft E, with its worm $b$, adjusting-cam H, with its operating-shaft I J, and holding-bolts K K, substantially as and for the purposes set forth.

GEO. S. BARTON.

Witnesses:
    THOS. H. DODGE,
    CHAS. H. BURLEIGH.